United States Patent [19]

Schletzbaum et al.

[11] Patent Number: 4,782,714

[45] Date of Patent: Nov. 8, 1988

[54] MULTI-RANGE SYNCHRONIZED TRANSMISSION AND HOUSING THEREFOR

[75] Inventors: John W. Schletzbaum, Hudson; Howard T. Uehle, Cedar Falls; David L. Mixdorf, Waterloo; Claire E. Rojohn, Denver; Kendall D. Tjepkes, Dike, all of Iowa

[73] Assignee: Deere & Company, Moline, Ill.

[21] Appl. No.: 38,187

[22] Filed: Apr. 14, 1987

[51] Int. Cl.$^4$ .......................... F16H 3/08; F16H 5/06
[52] U.S. Cl. ........................................ 74/360; 74/331; 74/337.5
[58] Field of Search ................. 74/740, 359, 360, 331

[56] References Cited

U.S. PATENT DOCUMENTS

| | | | |
|---|---|---|---|
| 1,155,601 | 10/1915 | Miles | 74/740 |
| 2,772,652 | 12/1956 | DuShane et al. | 74/337.5 |
| 2,804,780 | 9/1957 | Gerst | 74/360 |
| 2,839,941 | 6/1958 | Rugen | 74/337.5 X |
| 2,953,942 | 9/1960 | Schwartz et al. | 74/360 X |
| 2,972,901 | 2/1961 | Gerst | 74/331 X |
| 3,400,601 | 9/1968 | Ruhl et al. | 74/360 X |
| 3,465,609 | 9/1969 | Fisher et ala. | 74/360 |
| 3,654,819 | 4/1972 | Link | 74/360 |
| 3,710,637 | 1/1973 | Fisher et al. | 74/331 |
| 3,774,474 | 11/1973 | Decker et al. | 74/740 |
| 3,916,714 | 11/1975 | Sisson et al. | 74/331 |
| 4,023,439 | 5/1977 | Herr | 74/781 R |
| 4,063,464 | 12/1977 | Crabb | 74/331 |
| 4,341,127 | 7/1982 | Stodt | 74/333 |
| 4,409,858 | 10/1983 | Lasoen | 74/337.5 |
| 4,589,295 | 5/1986 | Jerry et al. | 74/331 X |

Primary Examiner—Dirk Wright

[57] ABSTRACT

A collar shift type transmission is arranged to provide an increased number of speed changes from a reduced number of gears and shafts. The transmission has a main shaft, an output shaft and two intermediate shafts with a plurality of intermeshing gear sets located about each shaft. Collar shift elements for engaging different gears to provide a multiplicity of speed and range changes are provided only on the main shaft and one intermediate shaft. Arrangement of the gears of each set in pairs maximizes the number of gear changes while minimizing the required number of gears, collar shift elements and control mechanisms. The main shaft preferably is provided with synchronizer clutches and close coupled to the driven portion of a main clutch to minimize the momentum transfer through the synchronizers. A sectional housing for the transmission supports an eccentrically mounted hydraulic pump which can be rotated to a plurality of positions. An additional housing section can be added to hold a planetary gear system between the clutch and a power source to double the number of speeds while still minimizing the momentum transfer across the synchronizer clutches. The main shaft preferably is hollow to allow insertion of a PTO shaft connected directly to the power source.

30 Claims, 8 Drawing Sheets

MULTI-RANGE SYNCHRONIZED TRANSMISSION AND HOUSING THEREFOR

BACKGROUND OF THE INVENTION

1. Field of the Invention

The present invention relates to multi-speed gear transmissions and more particularly, to constant mesh collar shift-type transmissions for large industrial or agricultural vehicles and housings therefor.

2. Description of the Related Art

Transmissions for agricultural and industrial vehicles must provide a wide variety of speeds and ranges to suit different load or draft requirements. Efficient and convenient operation of these vehicles demands that speed changes within a given range be made while the vehicle is moving.

A wide variety of transmissions meet these requirements by using collar shift and/or planetary elements to provide the speeds needed and to allow speed changes within selected gear ratios (ranges) while the vehicle is on the move. U.S. Pat. No. 4,063,464 (Crabb), for example, teaches a heavy-duty collar shift-type transmission having six shafts with collar shift clutches mounted on three of the shafts. The clutches control the interaction of numerous intermeshing gears mounted on the shafts to provide several ranges selectable while at rest and several speeds within each range selectable while moving. U.S. Pat. Nos. 3,654,819 (Link); 3,710,637 (Fisher et al.) and 4,341,127 (Stodt) teach similar transmissions using only four shafts with clutches on three of the shafts. The clutches are sometimes controlled hydraulically, e.g., as taught by Fisher et al., and sometimes by cams, e.g., as taught by U.S. Pat. No. 4,409,858 (Lasoen). Planetary systems sometimes are provided ahead of the collar shift transmission to add additional ranges, e.g., as taught by U.S. Pat. No. 3,774,474 (Recker et al.).

In collar shift arrangements, a main drive clutch generally is used to interrupt power input to the transmission when altering engagement of the collar shift elements. The collar shift elements often consist of synchronizer clutches adapted to couple rotating gear meshes with a synchronously rotating shafts. When the vehicle is in motion, the output portion of the power train has a very large amount of momentum, so that synchronization typically is achieved by altering the speed of the components upstream of the synchronizer to match the speed of the components downstream of the synchronizer. Since synchronizer longevity decreases as the momentum transfer across the synchronizers increases, the life of a synchronizer can be improved by minimizing the number and mass of elements between the main drive clutch and the synchronizer. In many transmission arrangements, synchronizer clutches are not closely coupled to the driven end of the main drive clutch and such arrangements have the disadvantage of decreasing synchronizer life.

Another frequent requirement for large industrial or agricultural equipment is availability of direct mechanical output from the engine to power a variety of service attachments. To fulfill this requirement, a power take-off (PTO) shaft often passes through or receives power from the transmission. It is advantageous to have a transmission through which a PTO may be routed without the addition of extra gear elements.

In addition to mechanical power, most agricultural and industrial equipment uses hydraulic power supplied by a hydraulic pump. The pump and transmission both receive mechanical input from a common power source so it is convenient to locate the gear elements and the pump in close proximity. However, combining the gear elements and the pump into one housing increases the size of the transmission and makes the combined housing less adaptable to a wide variety of applications.

Regardless of the exact structure employed, the long accepted objectives for transmissions are that they be efficient and lightweight. Accordingly, it is desirable to minimize the number of components within the transmission while still allowing a wide range of gear ratios. Reducing the number of components and their complexity also serves to reduce space and generally increases reliability. Furthermore, arranging the transmission to minimize the number of gear meshes between the input and output shafts of the transmission for a given gear ratio increases the overall efficiency.

In addition to the power and gearing requirements, the design of a transmission for a specific application also includes the adaptation of the transmission housing or its surroundings to suit a particular and often size-restricted location on a vehicle. Therefore, it also is desirable to have a transmission housing that is easily adaptable to varying constraints and application locations, and that will allow modification of the speed changes available from the transmission without a major alteration to the housing. U.S. Pat. No. 4,023,439 (Herr) teaches using modular transmission components to this end.

SUMMARY OF THE INVENTION

Accordingly, it is an object of the invention to provide a relatively simple and efficient multi-range collar shift transmission capable of shifting between a plurality of speeds and ranges.

Another object of this invention is to minimize the number of gear elements and gear meshes associated with each gear ratio.

Yet another object of this invention is to provide a transmission arrangement that minimizes the inertia of components between the synchronizer clutches and the main transmission clutch.

It is a further object of this invention to provide a transmission arrangement that facilitates routing of a PTO shaft through the transmission.

A further object of this invention is to provide an adjustable housing for a transmission having speed change gears and a hydraulic pump.

In a broad embodiment, this invention is directed to a multi-shaft collar shift transmission. The transmission has a rotatably driven first or main drive shaft surrounded by a plurality of gears which are rotatable relative to the shaft. Means are provided for selectively coupling the gears to the shaft, e.g., synchronizer-type collar shift elements. Each gear surrounding the main shaft is in driving relationship with another gear fixed to a second shaft which is rotatably mounted parallel to the main shaft. A third and a fourth shaft also are rotatably mounted parallel to the main shaft. A third plurality of gears rotatably surrounds the third shaft, while the fourth shaft has at least two fixed gears, each of which meshes with one of the gears surrounding the third shaft. Each gear surrounding the third shaft has a driven relationship with a gear on the second shaft or a driving relationship with a gear on the fourth shaft. First and second means, e.g., clash-type collar shift elements, selectively couple the third shaft to one of its gears which meshes with a second shaft gear and one of its gears which meshes with a fourth shaft gear. This structure provides all the required shift elements on just two of the four shafts, which allows for a more compact overall structure, simpler shift control and minimizes the number of gear meshes.

More specifically, each shaft has an even number of gears to provide the maximum number of gear changes in the most compact arrangement. Synchronizer clutches sandwiched between gear pairs for alternate engagement therewith selectively couple the gears to the first shaft, while clash-type collar shift elements sandwiched between gear pairs selectively couple the gears to the third shaft. Each gear on the first shaft then provides a speed change and range changes are determined by the gears on the third shaft.

Preferably, the main transmission is in a common housing with a main drive clutch for interrupting power flow between the collar shiftable gear elements and the engine which supplies power to the transmission. In order to optimize synchronizer life, the main shaft is directly coupled to the driven elements of the drive clutch. So locating the clutch minimizes the shaft length and momentum transfer across the synchronizers on the main shaft.

In yet another embodiment, the transmission of this invention will accommodate a PTO shaft. For this purpose, the main drive shaft is hollow so that the PTO shaft can pass through the drive shaft and into direct engagement with the power input to the main shaft.

In a further embodiment, the housing of the invention has at least two sections, one containing the main transmission and the other a hydraulic pump. The housing section containing the hydraulic pump is fastened to the housing section containing the gear change elements about an opening through which mechanical power is transferred. The pump is located eccentrically about the opening and may be secured to the gear housing section in a plurality of relatively rotated positions. Sealing surfaces surround both housing section openings.

The pump housing section has an input shaft for the transmission passing therethrough. A gear on the input shaft is in driving relationship with a pump shaft to deliver power to the pump. The input shaft also communicates power through contiguous openings in the two housing sections and connects with the main transmission drive shaft located in the transmission portion of the housing. The connection can be by a simple spline and groove arrangement or can include a drive clutch, additional speed change means, and flexible drive elements. As a result, the connection can allow the input shaft to be offset laterally and/or angularly from the transmission drive shaft. Any angular or lateral offset of the input shaft with respect to the transmission drive shaft will be varied in orientation as the pump is located at different eccentric positions.

In a further embodiment of the invention, the gear and pump housing sections are adapted to receive an additional housing section between their respective sealing surfaces. The means for transferring power from the input shaft to the drive shaft can be adapted to communicate power across the additional housing section. The additional housing section serves to increase the internal volume of the transmission to allow incorporation of additional speed change elements, e.g, a high-low power shift planetary placed ahead of the main clutch and receiving the power input for the transmission. In this location, the momentum associated with the gear elements of the power shift planetary is uncoupled from the first shaft when the main drive clutch is disenaged. The additional housing section may also contain all or part of the control system for the additional speed change elements.

DESCRIPTION OF THE PREFERRED EMBODIMENT

Figure 1:
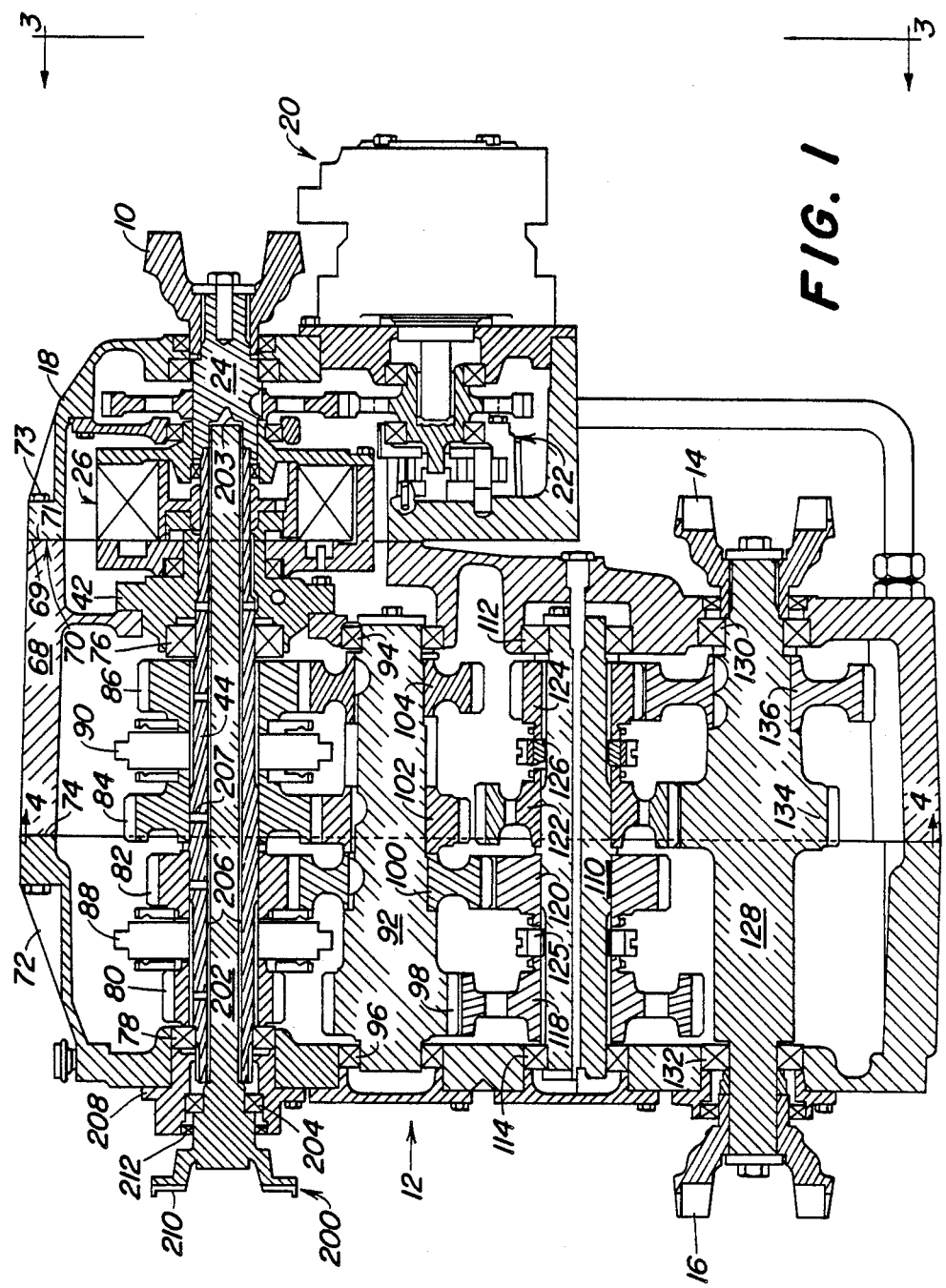
FIG. 1 is an offset view in partial section of a transmission arranged in accordance with the invention.

As shown in FIG. 1, a transmission has an input coupler 10 for delivering power into a gear housing section, generally at 12, from which a pair of output couplers 14, 16 extend to transmit conditioned power to a vehicle drive train. For convenience throughout the specification, "front" and "back" will generally refer to the right and left sides, respectively, of FIG. 1.

Input coupler 10 has uninterrupted power communication with a prime mover (not shown) of a vehicle in which the transmission is located. A transmission of this type is particularly suited for large agricultural tractors or industrial vehicles where the input coupler 10 will be coupled to the output from a diesel engine. In this type of service, front output coupler 14 will be connected to a front differential for driving a pair of front wheels and rear output coupler 16 will be connected to a rear differential for driving a pair of rear drive wheels.

Input coupler 10 passes into a pump housing section 18. Housing section 18, which is shown in more detail in FIG. 2, supports a main hydraulic pump 20, a transmission pump 22, an input shaft 24 and a main drive clutch 26. Input coupler 10 engages and is secured to the front of input shaft 24. Housing 18 also supports the front of input shaft 24 through a bearing set 28 between the housing and the shaft. At its opposite end, input shaft 24 engages a clutch cover 30 which is rotatably supported by a bearing set 32. A bracket 34 fixes bearing set 32 in the housing. A clutch drum 38 is coupled to the back of cover 30 and is rotatably supported by a bearing set 40 located about a clutch manifold 42. A main drive shaft 44 having a hollow interior passes through and radially locates a drive clutch hub 36. The back end of input shaft 24 has a circular shoulder 46 for rotatably receiving the front of main drive shaft 44. Clutch 26 contains multiple disc and plate elements 47 which, by action of a piston 48, can frictionally connect cover 30 and hub 36 to couple and uncouple input shaft 24 from main shaft 44.

The center section of the input shaft 24 is surroundingly engaged by a spur gear 49. Spur gear 49 engages a pump drive gear 50 which is rotatably supported by bearing sets 52, 54 located in front housing section 18. Drive gear 50 engagingly surrounds a pump drive shaft 56 for main pump 20, preferably through an intermediate collar 57. Collar 57 is provided to enhance the flexibility of the design, since different size shafts 56 can be accommodated simply by changing the size of collar 57.

Opposite pump shaft 56, a drive stub 58 extends axially from drive gear 50 and drives a pump gear 60. Pump gear 60 engages another pump gear 62, and together they provide the working elements of transmission pump 22.

Thus, pump drive gear 50 simultaneously provides power to main hydraulic pump 20, which supplies pressurized fluid to various functions throughout the vehicle, and transmission pump 22, which supplies the pressurized fluid needs of the transmission. Such needs include pressurized fluid for piston chamber 48 and lubrication of the transmission, discussed below.

Looking again at FIG. 1, pump housing section 18 is bolted to forward gear transmission housing section 68 across a seam 70 arranged perpendicular to the rotational axis of input shaft 24 and main drive shaft 44. Annular sealing surfaces 69, 71 formed on housing sections 68, 18, respectively, surround and seal the circular opening defined at seam 70. As may be seen, the opening at seam 70, the drive mechanism for main drive shaft 44 and pumps 20, 22 are arranged such that housing 18 can be rotated to any position relative to housing 68 and still allow all components to operate.

Figure 3:
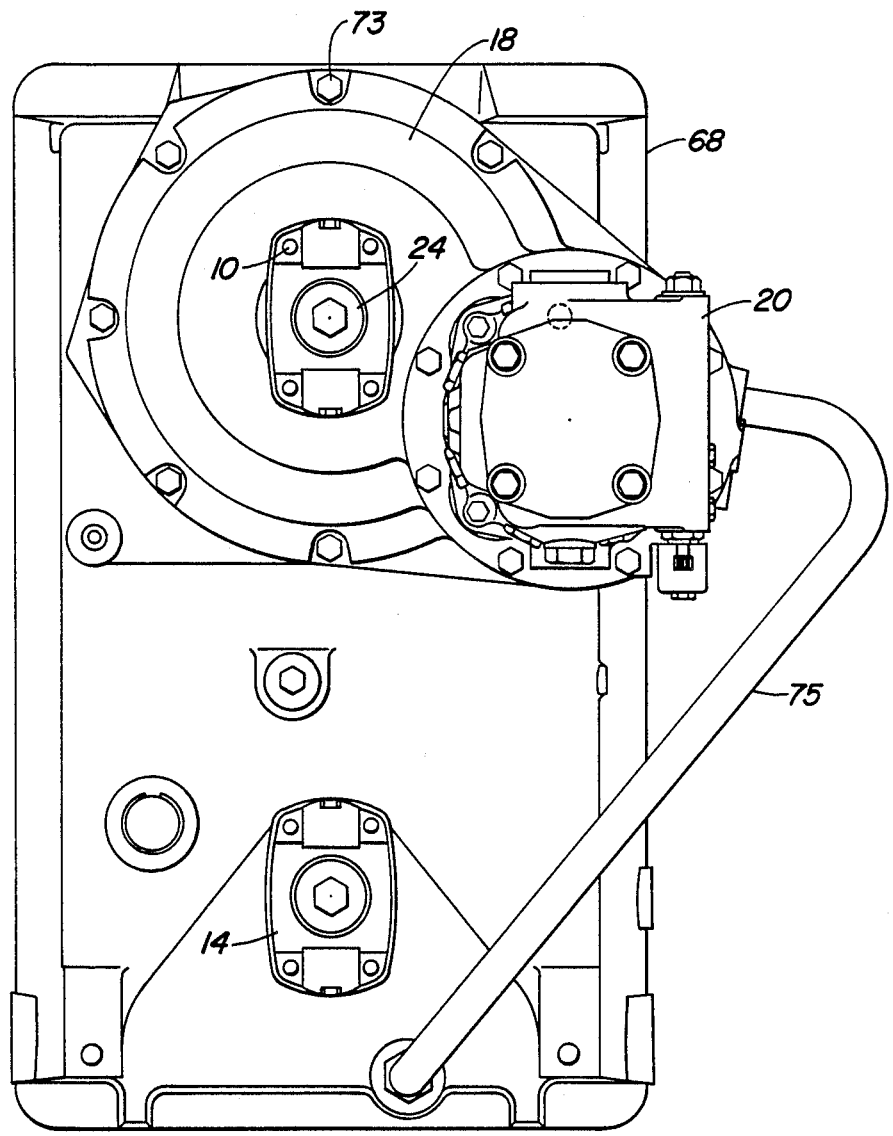
FIG. 3 is a plan view taken along line 3—3 in FIG. 1.

To take advantage of this, as best seen in FIG. 3, housing 18 is bolted to housing 68 by a series of fasteners 73 which urge surfaces 69, 71 into a sealing relationship. Eight fasteners 73 are arranged, preferably at equal radii and equal intervals, about the sealing surfaces 69, 71. Equal spacing of the fasteners 73 allows the pump housing 18 to be orbitally located about the input shaft 24 at 45 degree intervals. In this manner, the pump and transmission housing sections 18, 68 can be secured and sealed across the two sealing surfaces 69, 71 at a plurality of intervals or rotary positions equal in number to the number of fasteners. The number of intervals may be increased or decreased by the addition or subtraction of equally spaced fasteners. Housing 18 keeps the gears 49, 50 laterally offset by a constant radius, so that pumps 20, 22 remain in driven relationship with the input shaft 24 at any orbital position.

FIG. 3 also shows the arrangement of conduit 75 for a particular orbital position of pump housing 18. The configuration of conduit 75 must be varied as pump housing 18 is indexed about input shaft 24, either by use of a different conduit for each pump position or by the construction of conduit 75 from a material having sufficient flexibility to suit a plurality of pump housing positions.

Figure 2:
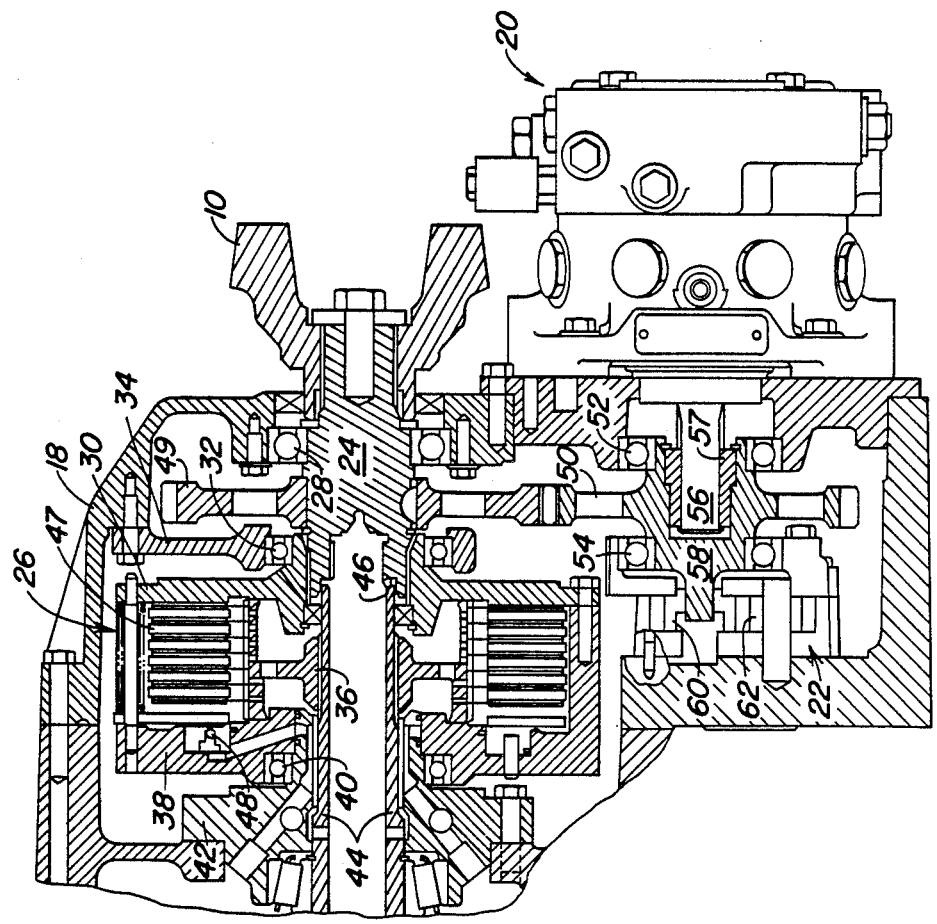
FIG. 2 is an enlargement of the upper right portion of FIG. 1.

FIGS. 1 and 2 show pump drive shaft 56 and input shaft 24 in parallel relationship. However, it is not essential for this invention that the pump shaft 56 be in a parallel relationship to input shaft 24. Appropriate bevel gear or screw gear designs are well known which would allow the pump shaft 56 to be placed at right angles or various degrees of offset with respect to input shaft 24 while still allowing rotation of the pumps 20, 22 about the axis of input shaft 24.

It also is possible to vary the drive coupling between input shaft 24 and main drive shaft 44 to offer a variation in offset or inclination between shafts 24 and 44. One example of such a variation is to provide a flexible drive coupling between the shafts 24, 44 which would incline the axis of input shaft 24 relative to main drive shaft 44. The flexible drive coupling could either be a constant velocity or hook type U-joint. As the pump housing 18 is rotated in such an arrangement, the orientation of the flexible drive also is varied.

Looking again at FIG. 1, a rearward gear housing section 72 is bolted to forward gear housing section 68 across seam 74 arranged parallel to seam 70. Seam 74 allows the overall gear housing section 12 to be split for installation and assembly of the shafts and gears shown in FIG. 1. Bearing set 76, located in clutch manifold 42, and bearing set 78, located in the rearward gear housing section 72, rotatably support main drive shaft 44 about a common axis with input shaft 24.

Proceeding from the rear to the front of the shaft, a reverse gear 80, a low gear 82, a high gear 84, and a medium gear 86 surround the main shaft 44 for concentric rotation relative thereto. Gears 80, 82, 84 and 86 have 21, 27, 36 and 31 teeth, respectively. A pair of synchronizer clutches 88, 90 engagingly surround shaft 44 between reverse and low gears 80, 82 and high and medium gears 84, 86, respectively. Through appropriate control means, described below, synchronizer clutches 88, 90 may be urged axially to engage the adjacent gear elements when clutch 26 interrupts power flow from input shaft 24 to main drive shaft 44.

Figure 10:
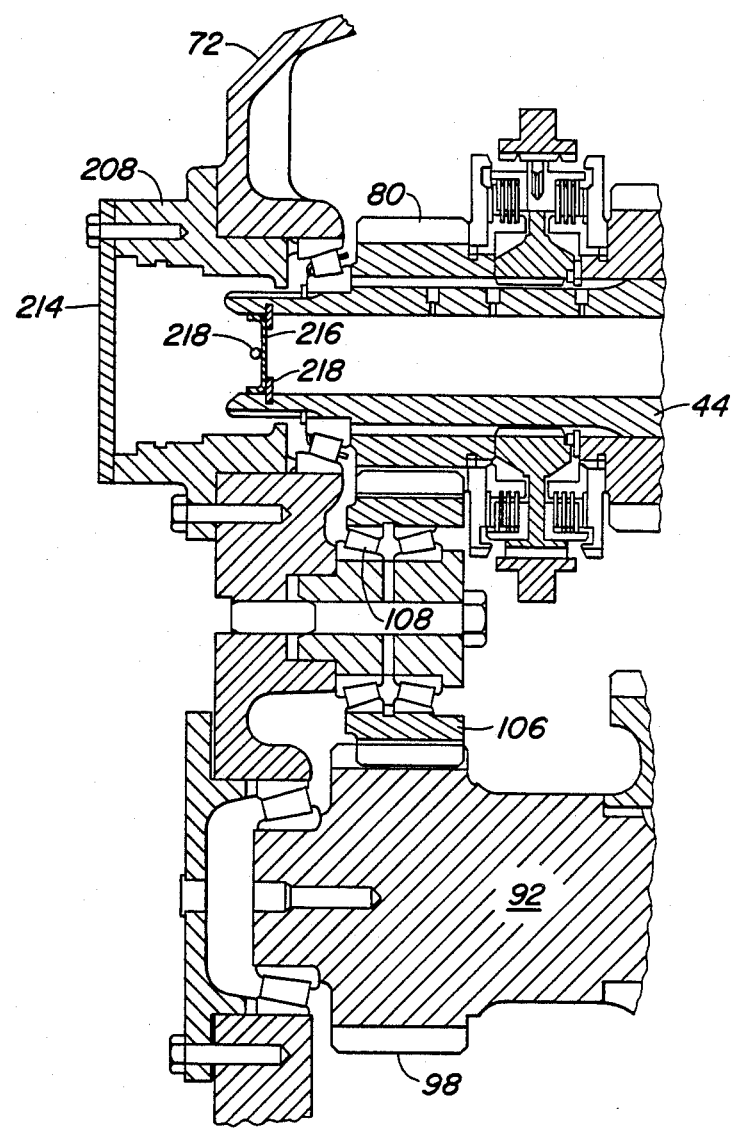
FIG. 10 is an enlargement of an alternative embodiment of the upper left portion of FIG. 1.

Upper countershaft 92 is downwardly offset from the main drive shaft 44 and rotatably supported parallel thereto by the forward and rearward gear housing sections 68, 72 through bearing sets 94, 96, respectively. Each gear on main shaft 44 is in a constant driving relationship with a corresponding gear on countershaft 92. An integral gear element 98 is formed about the periphery of countershaft 92, adjacent to bearing set 96. A group of gears 100, 102, 104 having 37, 28 and 33 teeth, respectively, are keyed along shaft 92 and respectively mesh with low gear 82, high gear 84 and medium gear 86. Integral gear element 98 has 24 teeth arranged about its periphery and is in a driving relationship with gear 80 through an idler gear 106, as shown in FIG. 10, making gear 80 a reverse gear. Idler gear 106 is supported by rearward housing section 72 through a set of bearings 108 secured to housing 72, and has 23 teeth.

Returning to FIG. 1, forward and rearward gear housing sections 68, 72 rotatably support, through bearing sets 112, 114, a lower countershaft 110 along an axis parallel to the axis of main drive shaft 44 and offset downwardly from upper countershaft 92. A series of gears 118, 120, 122, 124 are spaced along shaft 110 from the rearward to the forward end, each gear having 47, 34, 38 and 24 teeth, respectively. Each of these gears surrounds shaft 110 for relative rotation thereto. A pair of collar shift elements 125, 126 are located between gear pairs 118, 120 and 122, 124, respectively. Collar shift elements 125, 126 are each of the clash engagement type and can be used to engage selectively either adjacent gear, when properly aligned and moved axially by a shifting mechanism described below. Gears 118, 120 constantly mesh with gears 98, 100, respectively, while gears 122, 124 mesh with another pair of gears fixed to output shaft 128.

Output shaft 128 is downwardly offset from the lower countershaft 110 and rotatably supported by the forward and rearward housing sections 68, 72 through bearing sets 130, 132, respectively. As with all of the shafts, the output shaft 128 is rotatable about an axis parallel to main drive shaft 44. The front and rear ends of output shaft 128 extend out of the transmission housing 12 and have front and rear output couplers 14, 16 attached respectively thereto. An integral gear element 134 having 31 teeth is formed about the periphery of output shaft 128 and meshes with gear 122 of the lower countershaft 110. A gear 136 having 46 teeth is keyed to shaft 128 in an axial position ahead of gear 134 and meshes with gear 124 of the lower countershaft 110.

Figure 4:
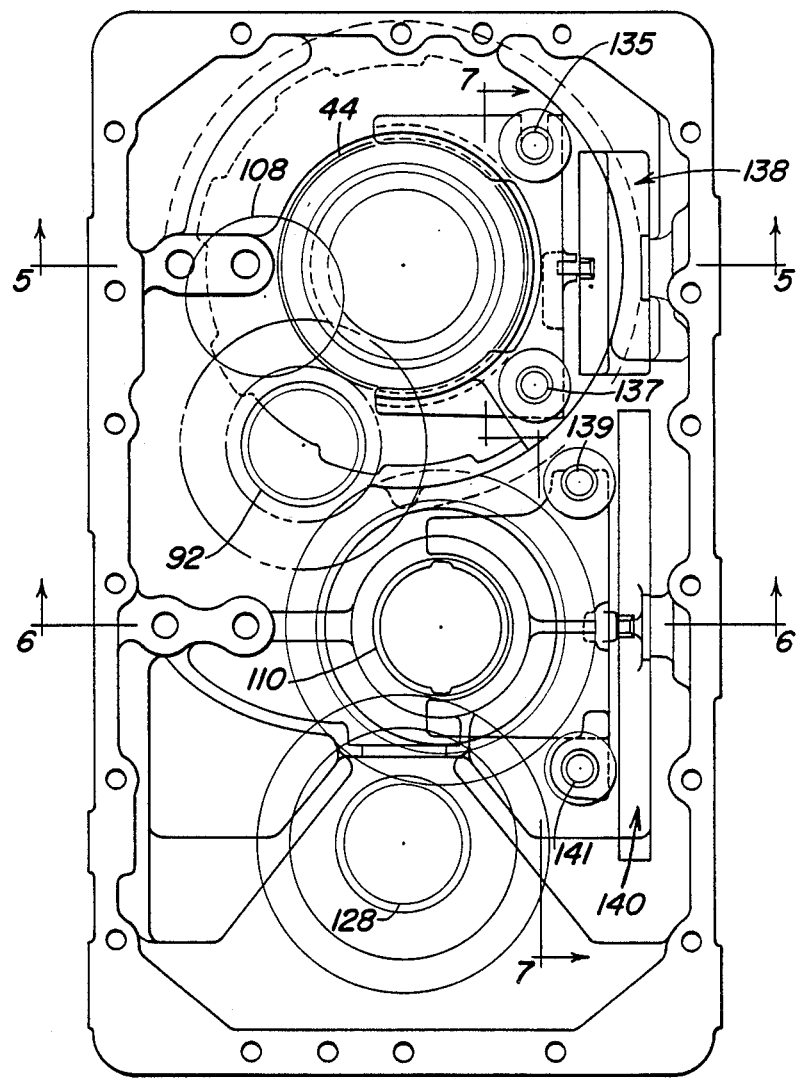
FIG. 4 is a plan view in partial section of the transmission along line 4—4 in FIG. 1.

FIG. 4 shows a view along seam 74 of shafts 44, 92, 110 and 128, in their relative lateral positions, along with idler gear 108. FIG. 4 also shows positioning of a speed shifter assembly 138 and a range shifter assembly 140 to one side of shafts 44 and 110, respectively. These shifter assemblies engage and displace synchronizer clutches 88, 90 on shaft 44, and collar shift elements 125, 126 on shaft 110. Shifter assembly 138 is supported in part by a pair of rods 135, 137. Shifter assembly 140 is supported in part by a pair of rods 139, 141.

Figure 5:
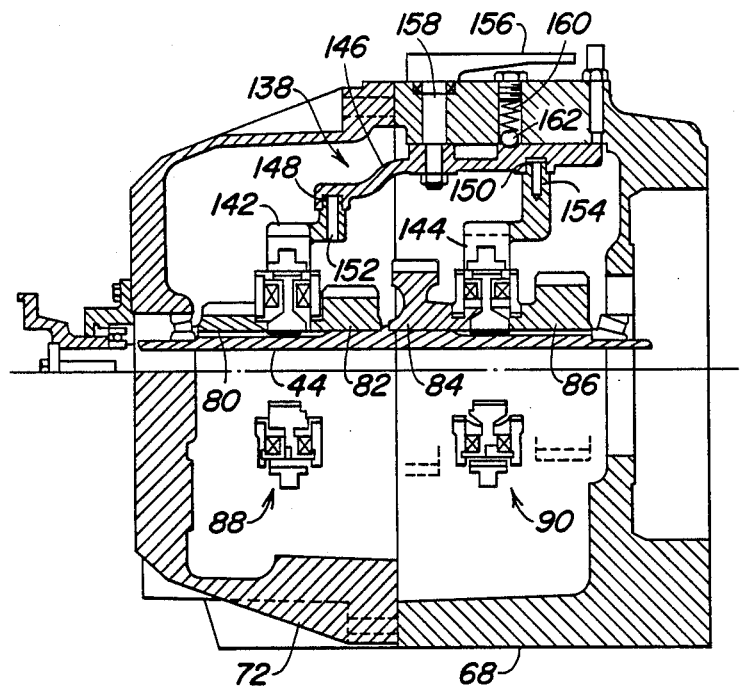
FIG. 5 is a plan view in partial section of the upper control linkage taken along line 5—5 in FIG. 4.

Looking at FIG. 5, the speed shifter assembly 138 retains synchronizers 88, 90 in open engagement collars 142, 144, respectively. Engagement collars 142, 144 each have respective cam following guide pins 152, 154 projecting therefrom. Movement of the synchronizers 88, 90 along the axis of shaft 44 is controlled by a shifter plate 146 having a pair of cam tracks 148, 150 for slidably receiving pins 152, 154, respectively. Plate 146 can be rotated by movement of lever arm 156, which is coupled thereto by a shaft 158 extending through the wall of forward gear housing section 68. A detent mechanism 160 having a spring-biased ball 162 affords precise rotational control of plate 146 and lends stability to positioning of the synchronizers.

Figure 6:
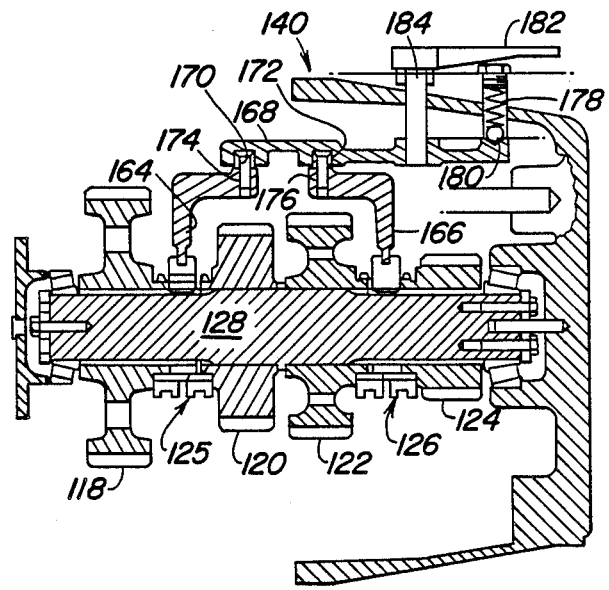
FIG. 6 is a plan view in partial section of the lower control linkage taken along line 6—6 in FIG. 4.

Similarly, as shown in FIG. 6, the range shifter 140 uses open shift collars 164, 166 to retain collar shift elements 125, 126, respectively. Movement of the shift collars 125, 126 again is controlled through a shifter plate 168 having cam tracks 170, 172 for respectively slidably engaging cam following guide pins 174, 176 which extend respectively from shifter collars 164, 166. Range shifter assembly 140 has a detent mechanism 178 with a spring-loaded ball 180 which provides precise rotational control of plate 168. A lever arm 182 rotates shifter plate 168 via a shaft 184 which passes through the wall of housing section 68.

Figure 7:
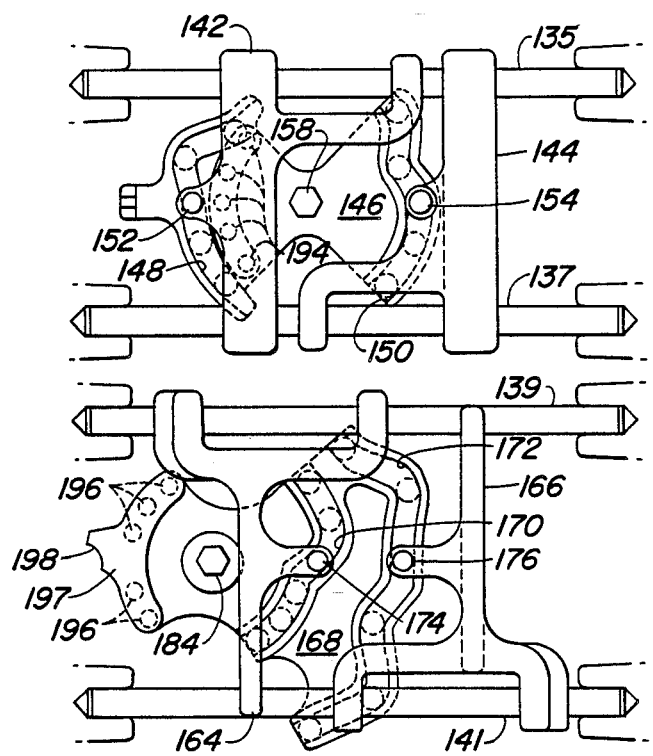
FIG. 7 is an offset plan view of the upper and lower control linkages taken along line 7—7 in FIG. 4.

FIG. 7 illustrates a side view of both shifter assemblies 138, 140. This figure shows open engagement collars 142, 144 linearly guided by support rods 135, 137 located at the top and bottom, respectively, of the collars. Analogously, open shift collars 164, 166 are linearly guided along top rod 139 and bottom rod 141. Rods 135, 137, 139, 141 are all located parallel to the main drive shaft 44. FIG. 7 also shows the configuration of tracks 148, 150 defined in shifter plate 146 for the speed shifter 138 and tracks 170, 172 defined in shifter plate 168 for the range shifter 140.

Detent ball 162 (see FIG. 5) is adapted to be received in a series of pockets 194 spaced circumferentially along shifter plate 146. As shifter plate 146 is rotated, detent ball 162 will align and engage one of the hemispherical pockets in the series 194. Each pocket corresponds to a shift position for the synchronized shift elements on the main transmission drive shaft 44. Beginning at the top end of pocket series 194 as seen in FIG. 7 and proceeding to the bottom end, the pockets correspond to high, medium, neutral, low, and reverse gears. As the shifter plate rotates to a shift position, guide pins 152, 154 will assume the relative radial positions indicated by the circles in their associated tracks 148, 150 which lie on a common axis with the corresponding pocket 194 and the centerline of shaft 158.

Range shifter plate 168 may similarly be rotated to obtain a variety of operational positions associated with a series of pockets 196 which receive detent ball 180 (see FIG. 6). Beginning again at the top end of pocket series 196 as seen in FIG. 7 and proceeding to the bottom end, the pockets correspond to a park position and gear ranges A through D. The extended space 197 between ranges B and C corresponds to a neutral position. As shifter plate 168 rotates to a shift position, guide pins 174, 176 will assume the relative radial positions indicated by the circles in their associated tracks 172, 174 which lie on a common axis with the corresponding pocket 196 and the center of shaft 184, or in the case of the neutral position, the centerline of shaft 184 and a point about midway between the pockets 196 for ranges B and C. Radially adjacent to hemispherical pockets 196, range shifter plate 168 has an outwardly extending cam lug 198 which can engage a park pawl (not shown) to prevent rotation of the output shaft 128 and consequent movement of the vehicle when shifter plate 168 is rotated into the park position.

Thus, through appropriate linkages, lever arms 156, 182 can manipulate synchronizer clutches 88, 90 and collar shift elements 125, 126 to obtain the speed and range gear ratios indicated in the following table:

| Speed and Range | Drive Shaft to Upper C Shaft | Upper C Shaft to Lower C Shaft | Lower C Shaft to Output Shaft | Output/Input Ratio |
| --- | --- | --- | --- | --- |
| Low A | 27T-37T | 24T-47T | 24T-46T | .194 |
| Med A | 31T-33T | 24T-47T | 24T-46T | .250 |
| High A | 36T-28T | 24T-47T | 24T-46T | .343 |
| Low B | 27T-37T | 37T-34T | 24T-46T | .414 |
| Med B | 31T-33T | 37T-34T | 24T-46T | .533 |
| High B | 36T-28T | 37T-34T | 24T-46T | .730 |
| Low C | 27T-37T | 24T-47T | 38T-31T | .457 |
| Med C | 31T-33T | 24T-47T | 33T-31T | .588 |
| High C | 36T-28T | 24T-47T | 38T-31T | .805 |
| Low D | 27T-37T | 37T-34T | 38T-31T | .973 |
| Med D | 31T-33T | 37T-34T | 38T-31T | 1.253 |
| High D | 36T-28T | 37T-31T | 38T-31T | 1.715 |
| Rev A | 21T-24T | 24T-47T | 24T-46T | .233 |
| Rev B | 21T-24T | 37T-34T | 24T-46T | .497 |
| Rev C | 21T-24T | 24T-47T | 38T-31T | .548 |
| Rev D | 21T-24T | 37T-34T | 38T-31T | 1.167 |

For each speed and range indicated in the table, the chart indentifies each intermeshing gear between the shafts by the number of gear teeth. "C Shaft" in the table caption is short for "countershaft".

The table lists four gear ranges A through D. The gear ranges are determined by the position of the collar shift elements 125, 126 on the lower countershaft 110, with each range offering a successively higher array of speeds. In each range, a low, a medium, and a high forward speed can be selected by the position of the synchronizer clutches 88, 90 on the main drive shaft 44. There is also a reverse speed for each range, as indicated in the last four lines of the table.

The ranges are selected by placing the range shifter 140 in one of the aforementioned positions A through D. The lowest range A is obtained by coupling gears 118 and 124 to the lower countershaft 110. The next highest range B is obtained by coupling gears 120 and 124 to the lower countershaft 110. Range C, which is in turn higher than range B, has gears 118 and 122 coupled with the lower countershaft 110. Range D, the highest range, couples gears 120 and 122 to the lower countershaft 110. For each range, the low, medium, high and reverse speeds are obtained by coupling the upper countershaft 92 with the main drive shaft 44 through the corresponding gear on the main drive shaft 44. Accordingly, to obtain low or reverse speed, synchronizer clutch 88 is shifted forwardly or rearwardly, respectively, and to obtain medium or high speed, synchronizer clutch 90 is moved forwardly or rearwardly, respectively.

Since collar shift elements 125, 126 associated with the range shifter 140 are clash-type elements, the vehicle must be stopped when shifting between ranges so that all relative motion between shaft 110 and the gears located thereon is eliminated. However, shift elements 125, 126 may be replaced by synchronizer clutches to allow synchronized shifting between ranges when desired. Once a range has been selected, the synchronizer elements 88, 90 allow the operator to shift between speeds without stopping motion of the vehicle. However, it still is necessary to disengage the main drive clutch 26 and interrupt power flow through the transmission when shifting between speeds. By coupling the driven portion of the clutch 26 directly to the main drive shaft 44, the operating life of the synchronizers 88, 90 is prolonged due to closeness of the main clutch and synchronizers, which minimizes the inertia that must be overcome by the synchronizers.

In addition to providing an efficient gear arrangement, the offset shaft arrangement of this invention facilitates the optional addition of a PTO. Referring again to FIG. 1, the PTO is shown generally at 200. The PTO has a solid shaft 202 which passes through the hollow interior of main drive shaft 44. The front end of the shaft 202 is engagingly supported in a cavity 203 at the back end of input shaft 24. A bearing set 204 surrounds the other end of PTO shaft 202 and rotatably aligns the shaft in housing sleeve 208. Housing sleeve, 208 in turn retains bearing set 204. A PTO coupler 210 is attached to the end of shaft 202 that extends through sleeve 208. An oil seal 212 surrounds PTO coupler 210 and abuts the inside of the sleeve 208 to prevent oil leakage from around the PTO shaft 202. The PTO installed in this manner provides a direct power link between the prime mover attached to input shaft 24 and the PTO coupler 210.

The cross-sectional area of the PTO shaft 202 across the hollow interior of main drive shaft 44 defines an annular area 206 which allows a restricted flow of lubricants to reach a series of ports 207 for lubricating the gears. With shaft 202 in place, the annular area 206 is small enough to prevent excessive fluid loss out the back of main drive shaft 44.

If the PTO is not desired for a particular application, it may be removed or not installed. When the PTO shaft 202 is not present, the opening at the back of sleeve 208 is sealed by bolting a cover plate 214 to the outside of sleeve 208, as shown in FIG. 10. To restrict fluid flow through the hollow interior of main drive shaft 44 when the PTO is not present, a plug 216 blocks the hollow interior at the back of the main drive shaft 44 and is held in place by compression pins 218.

Figure 8:
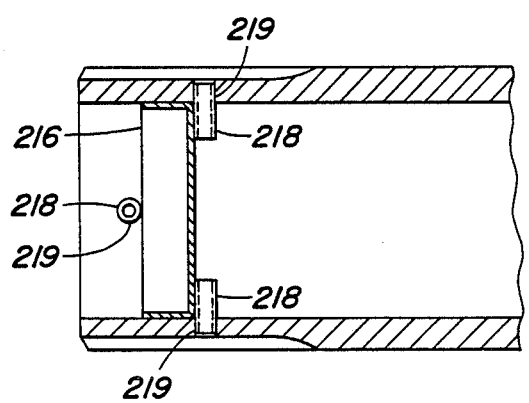
FIG. 8 is a seal detail of the main drive shaft of FIG. 1.

FIG. 8 shows the arrangement of the plug 216 and pins 218 at the back of main drive shaft 44 in more detail. Compression pins 218 are designed to retain the plug 216, when necessary, while permitting removal of the plug 216 and the pins 218 without removal of the main drive shaft 44 from the transmission. As can be seen from FIGS. 8 and 10, there are two pins 218 on each side of plug 216 which fit into diametrically opposed openings 219. Openings 219 are sized to compress the pins 218 when inserted therein and frictionally retain them within the end of the shaft 44. To remove the plug 216, the outer pins 218 are slid inward by reaching in from the end of the shaft 44 with pliers. After removal of the plug 216, the inner pins 218 are slid out in a similar manner, thereby leaving the opening clear for insertion of the PTO shaft 202. The split arrangement of the pins 218 allows their removal without removal of the main drive shaft 44 from the transmission, as would be required if a solid pin, bridging the inner diameter of the main drive shaft 44, were used.

Figure 9:
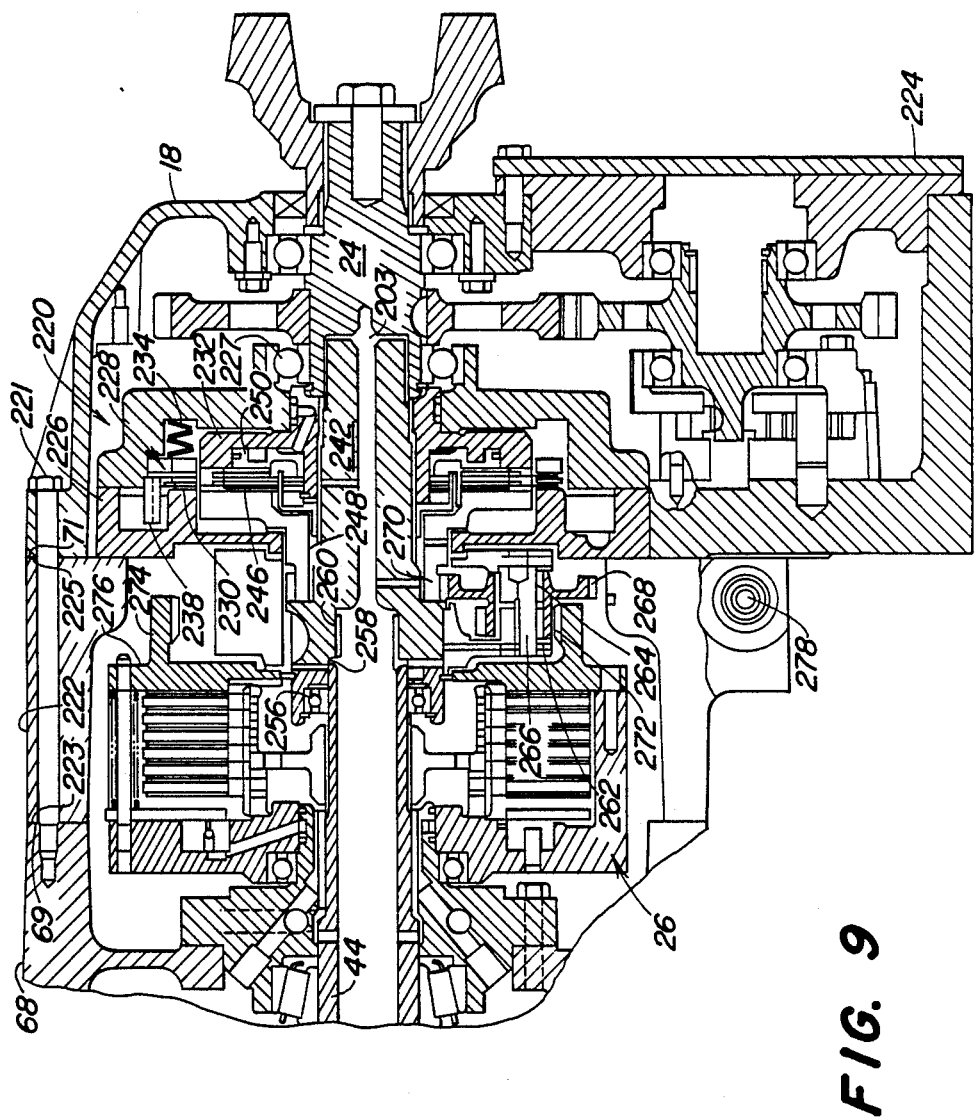
FIG. 9 is an enlargement of an alternative embodiment of the upper right portion of FIG. 1.

The total number of speed changes or gears may be doubled by modifying the transmission of FIG. 1 to include a high-low planetary section 220, as shown in FIG. 9. FIG. 9 also shows optional elimination of hydraulic pump 20 from housing section 18, with the opening for the pump 20 closed by pump cover plate 224. Space for the high-low planetary section 220 is added to the transmission housing by bolting a housing section 222 between pump housing section 18 and forward gear housing section 68. Housing section 222 has sealing surfaces 223, 225 matching sealing surfaces 69, 71 at each of its ends to maintain the prior tight seals. Elongated bolts 221 extend through openings in section 222 to section 68 to support section 18 in any of a plurality of positions.

A planetary housing 226 of high-low planetary 220 is bolted directly to housing section 222. The front of planetary housing 226 rotatably supports shaft 24 through a bearing set 227 to replace the function of bearing set 32 and support bracket 34 as shown in FIG. 2. A brake assembly 228, having a set of Bellville springs 234, frictionally engages brake disc and pad set 230. The discs and pads of set 230 are coupled respectively to the planetary housing 226 and a clutch drum 232, so that engagement of brake 228 acts to restrain clutch drum 232 from rotation. Fluid pressure acting on a brake piston 238 releases the clutch drum 232 for rotation by relieving the force of springs 234, thereby releasing brake pad and disc set 230.

Clutch drum 232 is rotatably supported about a connecting shaft 242. Clutch discs and plates 246 are attached, respectively, to a clutch hub 248 and clutch drum 232. Clutch discs and plates 246 couple clutch drum 232 to shaft 242 via hub 248 when urged into contact by fluid pressure acting on a piston 250.

Shaft 242 is engagingly inserted into cavity 203 of input shaft 24. At an end opposite cavity 203, connecting shaft 242 retains a bearing set 256 within a cavity 258. Bearing set 256 surrounds the front end of main drive shaft 44 to align and guide the back of connecting shaft 242 while allowing relative rotation therebetween. A smaller diameter section of cavity 258 has a set of splines 260 for engaging the PTO shaft 202 which may be inserted therein. A planetary carrier 262 surrounds connecting shaft 242 and is keyed thereto. The planetary carrier 262 rotatably supports a set of three double planet gears 264 about a set of shafts 266 attached thereto. Forward teeth 268 of double planet gears 264 mesh with a sun gear 270 extending from clutch drum 232. Rearward teeth 272 of gears 264 mesh with a ring gear 274. Ring gear 274 is integrally formed into a front clutch cover 276 which replaces clutch cover 30 of the main drive clutch 26 shown in FIG. 2. In addition to meshing with ring gear 274, the planetary gears 264 simultaneously guide the front of the clutch 26. By guiding the front of clutch 26 through the planetary gears 264, the front of the clutch is supported without a bearing set, thereby reducing space and cost, and eliminating a bearing set that would be subject to high loadings due to radial loads associated with planet gear/ring gear interaction.

The high-low planetary 220 is controlled through a solenoid port 278 for receiving a solenoid (not shown) which is energized to direct fluid pressure to the brake and clutch pistons simultaneously and de-energized to relieve fluid pressure acting on the brake and clutch pistons. De-energizing the solenoid leaves brake 228 engaged, which prevents rotation of clutch drum 232 and holds sun gear 270 stationary. Rotational motion of connecting shaft 242 then revolves planet gears 264 about sun gear 270, causing rotation of planet gears 264 about shafts 266. Engagement of the revolving and rotating planet gears 264 with ring gear 274 drives the main clutch cover 276 at a speed greater than the rotational speed of connecting shaft 242 and input shaft 24. Energizing the solenoid releases brake assembly 228 while simultaneously engaging clutch discs and plates 246 to couple connecting shaft 242 to clutch drum 232 via hub 248. As a result of this coupling, the sun gear 270 and planetary carrier 262 move at the same speed, so that main clutch cover 276 is driven by planet gears 264 at the same rotational speed as connecting shaft 242.

The control system thus is arranged such that, in the absence of fluid pressure, the planetary 220 automatically shifts into the overdrive or high drive condition to protect the planetary components from over-speed. Moreover, planetary 220 may be shifted from the direct drive to the overdrive condition and back while the transmission is under load. As a result, the planetary adds a power shift speed for each speed available in each range.

The high-low planetary 220 preferably will provide a direct drive and a 20% overdrive between input shaft 24 and main drive shaft 44. In addition, incorporating the solenoid port 278 into housing section 222 facilitates the simple addition of the high-low planetary 220. Thus, high-low planetary 220 is relatively simple to include in the transmission. Further details on the arrangement and operation of this type of planetary assembly may be obtained from U.S. Pat. No. 4,318,305 (Wetrich et al.), the teachings of which are hereby incorporated by reference.

The description of this invention in conjunction with a preferred embodiment and variations thereof is not meant to limit this invention to the details disclosed therein. Accordingly, applicants seek patent protection within the scope of the appended claims and all permissible equivalents.

We claim:

1. A transmission for a power source comprising:
   a first rotatable shaft rotatably drivable by the power source and having a first plurality of gears concentrically and rotatably mounted thereabout;
   first means for selectively coupling any gear of said first plurality to said first shaft;
   a second rotatable shaft parallel to said first shaft and having a second plurality of gears concentrically fixed thereto, each gear of said second plurality being drivable by a different gear of said first plurality;
   a third rotatable shaft parallel to said first shaft and having a third and a fourth plurality of gears concentrically and rotatably mounted thereabout, each gear of said third plurality drivable by a different gear of said second plurality;
   second means for selectively coupling any gear of said third plurality and any gear of said fourth plurality to said third shaft; and
   a fourth rotatable shaft parallel to said first shaft and having fifth plurality of gears concentrically fixed thereto, each gear of said fifth plurality being drivable by a different gear of said fourth plurality.

2. The transmission of claim 1, further comprising a main clutch having a first part drivable by the power source and a second part selectively drivable by the first part, said second part being drivingly connected to said first shaft.

3. The transmission of claim 2, further comprising speed change means for multiplying the number of speed changes available in said transmission, a first portion of said speed change means being drivable by the power source and a second portion of said speed change means being drivable by said first portion at different relative speeds, said second portion being drivingly connected to said first part of said main clutch.

4. The transmission of claim 3, wherein said speed change means comprises a planetary gear system.

5. The transmission of claim 4, wherein a sun gear of said planetary gear system comprises said first portion and a ring gear of said planetary gear system comprises said second portion.

6. The transmission of claim 1, further comprising an input shaft drivable by the power source and drivingly coupled to said first shaft.

7. The transmission of claim 6, wherein said first shaft is hollow and further comprising a power take-off shaft extending through said first shaft and directly drivable by said input shaft.

8. The transmission of claim 6, further comprising a transmission pump for providing hydraulic pressure for the transmission and a gear concentrically fixed to said input shaft for driving said transmission pump.

9. The transmission of claim 8, further comprising a main hydraulic pump for providing hydraulic pressure for use outside of the transmission, said main hydraulic pump being drivable by said gear on said input shaft.

10. The transmission of claim 9, further comprising a housing for said transmission having at least a first and a second housing section, said second, third and fourth shafts being contained in said first housing section and at least said main hydraulic pump being contained in said second housing section, wherein said housing sections are rotatable to a plurality of orbital positions relative to one another.

11. The transmission of claim 10, wherein at least one of said pumps is mounted eccentrically relative to said input shaft.

12. The transmission of claim 10, further comprising a third housing section between said first and second housing sections.

13. The transmission of claim 12, wherein said third housing section contains speed change means for multiplying the number of speed changes available in said transmission.

14. The transmission of claim 1, wherein said first coupling means comprises at least two clutches mounted on said first shaft and said second coupling means comprises at least two clutches mounted on said third shaft.

15. The transmission of claim 14, wherein said first and second coupling means each further comprises at least two cam surfaces and two cam followers guided by said cam surfaces and guiding said clutches, said cam surfaces of said first coupling means being so shaped that at most, one of said gears of said first plurality can be coupled to said first shaft at any given time, and said cam surfaces of said second coupling means being so shaped that at most one of said gears of said third plurality and one of said gears of said fourth plurality can be coupled to said third shaft at any given time.

16. The transmission of claim 15, wherein said first and second coupling means each further comprises a rotatable plate, said cam surfaces being formed as grooves in the corresponding plate.

17. The transmission of claim 16, wherein said first and second coupling means each further comprises a detent mechanism for holding the corresponding plate in a position such that at least one gear is coupled to the corresponding shaft.

18. The transmission of claim 1, further comprising at least one rotatable idler gear meshing with one gear each from said first and second pluralities.

19. An offset transmission comprising:
a main shaft adapted to be rotatably driven;
a first set of gears surrounding and rotatable about said main shaft;
a set of synchronizer elements coupled to said main shaft for selectively coupling any gear of said first gear set to said main shaft;
an upper countershaft rotatably mounted parallel to said main shaft having a second set of gears concentrically fixed thereto, each gear in said second set being drivable by a different gear in said first set;
a lower countershaft rotatably mounted parallel to said main shaft;
a third set of gears surrounding and rotatable about said lower countershaft, each gear in said third set being drivable by a different gear in said second set;
a fourth set of gears surrounding and rotatable about said lower countershaft;
a set of collar shift elements coupled to said lower countershaft for selectively coupling any gear of said third set and any gear of said fourth set to said lower countershaft;
an output shaft rotatably mounted parallel to said main shaft having a drive coupler at least one end thereof and a fifth set of gears concentrically fixed thereto, each gear in said fifth set being drivable by a different gear in said fourth set.

20. The transmission of claim 19, further comprising an input shaft and a main clutch, said main clutch selectively engaging and disengaging said main shaft and said input shaft.

21. The transmission of claim 20, wherein said main shaft is hollow and further comprising a power take-off shaft extending concentrically through said main shaft, said power takeoff shaft being uninterruptingly coupled for rotation with said input shaft.

22. The transmission of claim 19 further comprising a speed change device drivable by said main shaft and drivingly coupled to said input shaft for multiplying the number of speed changes available from said transmission.

23. The transmission of claim 19, wherein one gear of said first gear set and one gear of said second gear set are coupled through an idler gear to reverse the rotational direction of said upper countershaft relative to said main shaft when the one gear of said first set is coupled to said main shaft.

24. A double countershaft transmission comprising:
a main shaft adapted to be rotatably driven, said main shaft being surrounded by first, second, third and fourth gears spaced along and rotatable relative to said main shaft, and having first and second synchronizer clutches coupled thereto and located, respectively, between the first and second gears and between the third and fourth gears, for selectively coupling said gears to said main shaft;
an upper countershaft rotatably mounted parallel to and spaced from said main shaft having fifth, sixth, seventh and eighth gears concentrically fixed therealong, said sixth, seventh, and eighth gears being in constant meshing relationship with said second, third and fourth gears, respectively;
a rotatable idler gear constantly mashing with said first and fifth gears;
a lower countershaft rotatably mounted parallel to said main shaft and spaced from said main shaft to a greater extent than said upper countershaft, said lower countershaft being surrounded by ninth, tenth, eleventh and twelfth gears spaced along and rotatable relative to said lower countershaft, said ninth and tenth gears constantly meshing with said fifth and sixth gears, respectively, and said lower countershaft having third and fourth clash-type clutches coupled thereto and located, respectively, between the ninth and tenth gears and between the eleventh and twelfth gears, for selectively coupling the ninth, tenth, eleventh and twelfth gears to said lower countershaft; and
an output shaft rotatably mounted parallel to said main shaft and spaced from said main shaft to a greater extent than said lower countershaft, said output shaft having thirteenth and fourteenth gears concentrically fixed therealong, said thirteenth and fourteenth gears constantly meshing with said eleventh and twelfth gears, respectively.

25. The transmission of claim 24, further comprising a main clutch between said main shaft and a power source for the transmission for selectively interrupting power flow to the transmission, a driven member of the main clutch being coupled to a first end of said main shaft.

26. The transmission of claim 25, further comprising a planetary gear assembly between said main clutch and said power source for providing high and low speeds to said transmission, a driving member of the main clutch being coupled to an output end of the planetary gear assembly.

27. The transmission of claim 24, wherein said main shaft is hollow and further comprising a power take-off shaft passing concentrically and rotatably through said main shaft, said power take-off shaft extending out a second end of said main shaft.

28. A transmission housing for supporting transmission elements and at least one hydraulic pump, said housing comprising:
a first housing section containing a plurality of speed change elements for the transmission and defining a first opening, said opening being bordered by a first surface;

a second housing section rotatably supporting a power input shaft and supporting the at least one hydraulic pump eccentrically with respect to said input shaft, said second housing section defining a second opening and having a second surface bordering said opening, said second surface being arranged sealingly to engage said first surface at a plurality of orbital positions;

means for communicating power between said input shaft and said speed change elements;

means for transferring power from said input shaft to said at least one pump; and means for securing said second housing section to said first housing section at each of said plurality of orbital positions.

29. The housing of claim 28, wherein said power transfer means includes a first gear concentrically fixed to said input shaft for rotation therewith and a second gear fixed to a drive shaft for said at least one pump, said second gear being drivable by said first gear.

30. The housing of claim 28, wherein a third housing section having means for conditioning power flow is provided between said first and second housing sections, said third housing section having third and fourth surfaces arranged sealingly to engage said first and second surfaces, respectively, at each of said plurality of orbital positions.

* * * * *